O. DAHLKE.
SHAFT PACKING.
APPLICATION FILED SEPT. 19, 1912.

1,085,326.

Patented Jan. 27, 1914.

Witnesses
Marcus L. Byng.
Chas. B. Stokes.

Inventor
Oscar Dahlke
by Albert G. Davis
His Attorney

UNITED STATES PATENT OFFICE.

OSKAR DAHLKE, OF CHARLOTTENBURG, GERMANY, ASSIGNOR TO GENERAL ELECTRIC COMPANY, A CORPORATION OF NEW YORK.

SHAFT-PACKING.

1,085,326.   Specification of Letters Patent.   Patented Jan. 27, 1914.

Application filed September 19, 1912. Serial No. 721,217.

*To all whom it may concern:*

Be it known that I, OSKAR DAHLKE, a subject of the King of Prussia, residing at Charlottenburg, Germany, have invented certain new and useful Improvements in Shaft-Packing, of which the following is a specification.

This invention relates to devices for packing the joint between a rotating shaft and a stationary member through which it passes for the purpose of preventing the escape of fluid pressure through said joint. It has special reference to those packings employed in elastic fluid turbines to prevent leakage of motive fluid from one stage compartment to another, or to prevent leakage around the shaft where it passes through the wall of the wheel casing.

The present invention is an improvement upon that disclosed in my prior application filed June 20, 1912, Serial No. 704,836, and has a general resemblance thereto in that it employs two annular packing elements, one rotating and the other normally stationary, urged together by fluid pressure and so arranged that abnormal friction will produce a partial rotation of the normally stationary element and effect a reduction in the frictional pressure.

The novel feature of the present invention is a flexible diaphragm upon which the motive fluid can operate to effect a pressure between the packing elements, combined with means for regulating the admission of fluid pressure to said diaphragm in order to effect the desired balancing of moments between the packing elements.

Figure 1:
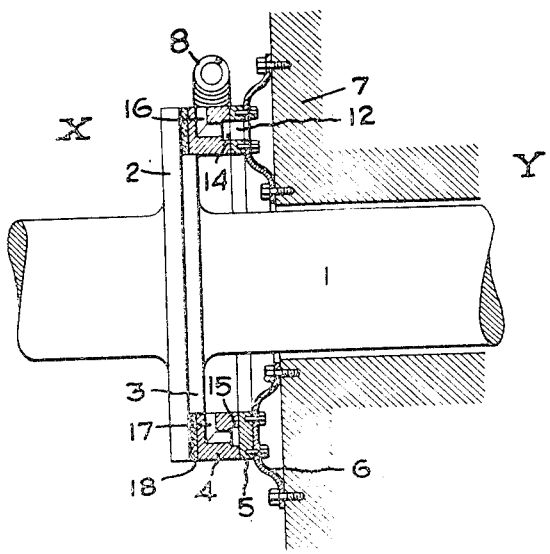
Figure 2:
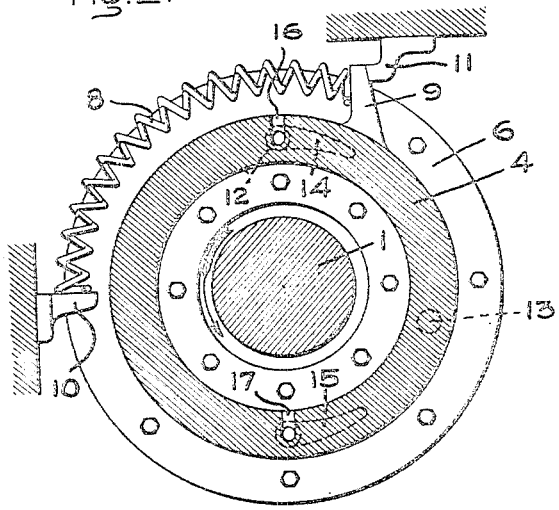

In the accompanying drawing, Figure 1 shows a longitudinal section and Fig. 2 a cross-section of my improved shaft packing or stuffing box.

Upon the shaft 1 is a flange 2 having a shoulder 3 of less diameter. On this shoulder is supported a ring 4 faced off to make a smooth fit with the flange and also with an annular plate 5 which is firmly secured to a flexible diaphragm 6, annular in shape and tightly attached along its edges to the wall or partition 7, through which the shaft passes. The packing ring 4 is prevented from rotating with the shaft by means of a tangentially-acting spring 8 which abuts at one end against a lug 9 on said ring and at the other end against an abutment 10 on the wall, partition or casing 7. The spring constantly acts in opposition to the direction of rotation of the shaft (arrow, Fig. 2) and urges the lug against a stop 11 on the casing 7.

Communication with the interior of the diaphragm is effected by two openings 12, 13 angularly spaced apart preferably less than 180 degrees. The packing ring has two passages 14, 15 preferably at diametrically opposite points, having tapering portions extending in opposite angular directions. From the passage 14 a duct 16 extends to the region X of higher fluid pressure. A similar duct 17 extends from the passage 15 to the region Y of lower fluid pressure. The chamber formed by the diaphragm and the casing may be brought into connection with either of these pressure regions by the angular shifting of the ring 4 with respect to the plate 5. The openings 12, 13 in the plate will register only successively with the passages 14, 15 in the ring.

When the shaft is at rest, the lug 9 is pressed by the spring against the stop 11, in which position the passage 14 registers with the opening 12, and the interior of the diaphragm is in communication with the region X of higher pressure. This causes the plate 5, the ring 4 and the flange 2 to be pressed tightly together. If now the shaft is set in rotation, the friction between the flange and the ring tends to rotate the latter, causing the lug 9 to compress the spring 8. But this angular movement of the ring slides the tapering portion of the passage 14 more and more over the opening 12, so that the supply of fluid pressure to the diaphragm chamber is gradually throttled. This reduces the surface pressure between the flange, the ring and the plate until the friction moment is reduced to an equality with the opposing moment of spring power, and the ring comes substantially to rest. However, if the complete closing of the opening 12 does not result in a state of balance, then in the further rotation of the ring 4, the small end of its passage 15, leading to the region Y of lower fluid pressure, comes to register with the opening 13, thereby permitting an escape of fluid pressure from the diaphragm chamber to said region of lower pressure and quickly establishing a balance of moments. By suitable variation of the spring pressure, the frictional interaction of the packing surfaces of the flange, ring and annular plate may be regulated as desired. Care must be taken that the moment of friction between the flange and the ring is greater than that between the latter and the annular plate, in order to enable the ring to be rotated by the flange. If necessary, a gasket 18, preferably of carbon, may be inserted between the flange and the ring. Or the friction surfaces on the flange and the ring may be made greater than those between the ring and the annular plate; or the latter surfaces may be slightly lubricated.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A shaft packing which comprises a rotating element, a ring in contact therewith, a diaphragm chamber exerting pressure on said ring, and means for regulating the admission of fluid pressure to said chamber.

2. The combination with a shaft having a flange, of a ring in frictional contact with said flange, a spring resisting the frictional moment of rotation of said ring, a diaphragm chamber exerting pressure on said ring, and means for regulating the admission of fluid pressure to said chamber by the relative rotation of said ring and chamber.

3. The combination with a shaft rotating in two regions of differing fluid pressures, of a flange on said shaft, a ring in frictional contact therewith, a spring resisting the frictional moment of rotation of said ring, a diaphragm adapted to exert a pressure on said ring, openings in said diaphragm, and two passages in said ring adapted to register successively with said openings.

4. The combination with a shaft rotating in regions of differing fluid pressures, of a flange on said shaft, a ring in frictional contact therewith, a spring resisting the frictional moment of rotation of said ring, a diaphragm adapted to exert a pressure on said ring, two openings therein, and two passages in said ring spaced a different angular distance apart from the openings in the diaphragm and tapering in opposite angular directions.

5. The combination with a shaft rotating in regions of differing fluid pressures, of a flange on said shaft, a ring in frictional contact therewith, a spring resisting the frictional moment of rotation of said ring, a diaphragm adapted to exert a pressure on said ring, two openings therein, and two passages in said ring spaced a different angular distance apart from the openings in the diaphragm and tapering in opposite angular directions, said passages communicating respectively with the regions of differing fluid pressure.

6. The combination with a shaft rotating in regions of differing fluid pressures, of a flange on said shaft, a ring bearing against said flange having a lug and provided with two passages opening respectively into said regions of differing pressures, an annular plate bearing against said ring, a flexible diaphragm carrying said plate, openings through said plate and diaphragm to register succesively with said passages, and a spring abutting against said lug in opposition to the direction of rotation of said shaft.

In witness whereof, I have hereunto set my hand this 3d day of September, 1912.

OSKAR DAHLKE.

Witnesses:
FRANZ GOLDSTEIN,
MARY FLEISCHFRENER.